(12) United States Patent
Okano et al.

(10) Patent No.: US 8,634,118 B2
(45) Date of Patent: Jan. 21, 2014

(54) IMAGE PROCESSING APPARATUS AND COMPUTER READABLE MEDIUM

(75) Inventors: Masashi Okano, Kanagawa (JP); Masato Saito, Kanagawa (JP); Hiromi Kita, Kanagawa (JP); Hiroshi Hayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 633 days.

(21) Appl. No.: 12/878,269

(22) Filed: Sep. 9, 2010

(65) Prior Publication Data
US 2011/0304894 A1 Dec. 15, 2011

(30) Foreign Application Priority Data
Jun. 11, 2010 (JP) ................................. 2010-134398

(51) Int. Cl.
*H04N 1/46* (2006.01)
*H04N 1/60* (2006.01)
*B41J 2/205* (2006.01)

(52) U.S. Cl.
USPC .............................. 358/530; 358/1.9; 347/15

(58) Field of Classification Search
None
See application file for complete search history.

(56) References Cited

U.S. PATENT DOCUMENTS

| 2005/0062779 A1* | 3/2005 | Mimamino ...................... 347/15 |
| 2006/0152746 A1* | 7/2006 | Ishii ............................... 358/1.9 |
| 2007/0064249 A1* | 3/2007 | Chiba ............................. 358/1.9 |

FOREIGN PATENT DOCUMENTS

| JP | 2004-242106 A | 8/2004 |
| JP | 4027814 A | 10/2007 |

* cited by examiner

*Primary Examiner* — Twyler Haskins
*Assistant Examiner* — Henok Shiferaw
(74) *Attorney, Agent, or Firm* — Sughrue Mion, PLLC

(57) ABSTRACT

An image processing apparatus includes a read unit and a first correction unit. The read unit reads a document and generates multilevel image data from the document. The first correction unit corrects the multilevel image data contained in a first range predetermined as a color indicating a fluorescent color so as to move the multilevel image data contained in the first range to an outside of a print color range when at least a part of the multilevel image data is contained in the first range.

14 Claims, 19 Drawing Sheets

FIG. 2

| KIND OF FLUORESCENT COLOR | RANGE OF R VALUE | RANGE OF G VALUE | RANGE OF B VALUE |
|---|---|---|---|
| YELLOW | 0-10 | 0-10 | 70-80 |
| ORANGE | 0-10 | 40-50 | 90-100 |
| PINK | 0-10 | 70-80 | 60-70 |
| PURPLE | 70-100 | 90-100 | 20-30 |

FIG. 3

| COMBINATION OF FLUORESCENT COLORS | FIRST THRESHOLD VALUE |
|---|---|
| YELLOW AND ORANGE | 30 |
| PURPLE AND PICK | 30 |

FIG. 4

| KIND OF FLUORESCENT COLOR | RANGE OF L* VALUE | RANGE OF a* VALUE | RANGE OF b* VALUE |
|---|---|---|---|
| YELLOW | 85-95 | (-30)-(-20) | 30-40 |
| ORANGE | 80-90 | 0-10 | 30-40 |
| PINK | 70-80 | 40-50 | (-10)-0 |
| PURPLE | 60-70 | 20-30 | (-40)-(-30) |

FIG. 5

| COMBINATION OF FLUORESCENT COLORS | SECOND THRESHOLD VALUE |
|---|---|
| YELLOW AND ORANGE | 20 |
| PURPLE AND PICK | 20 |

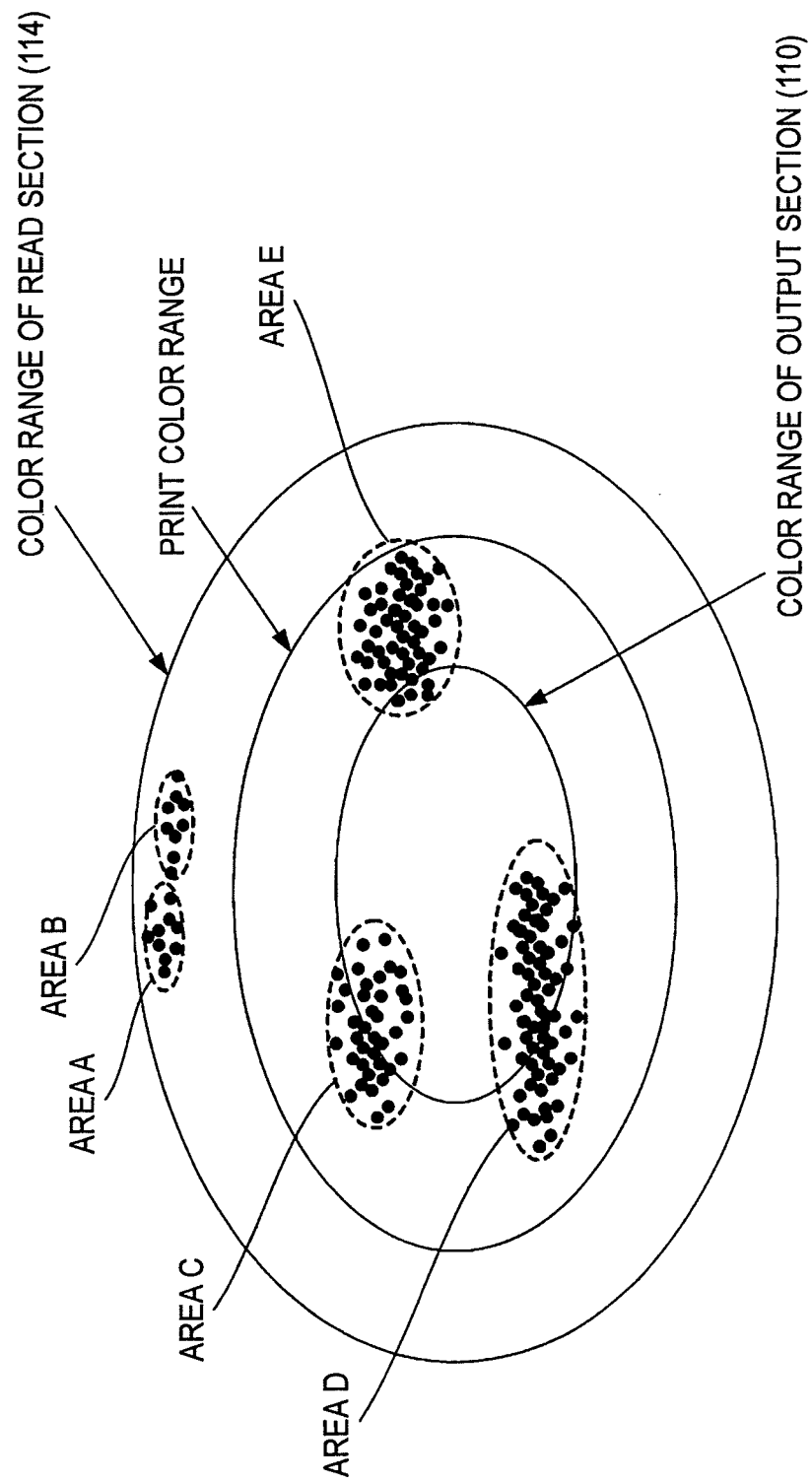

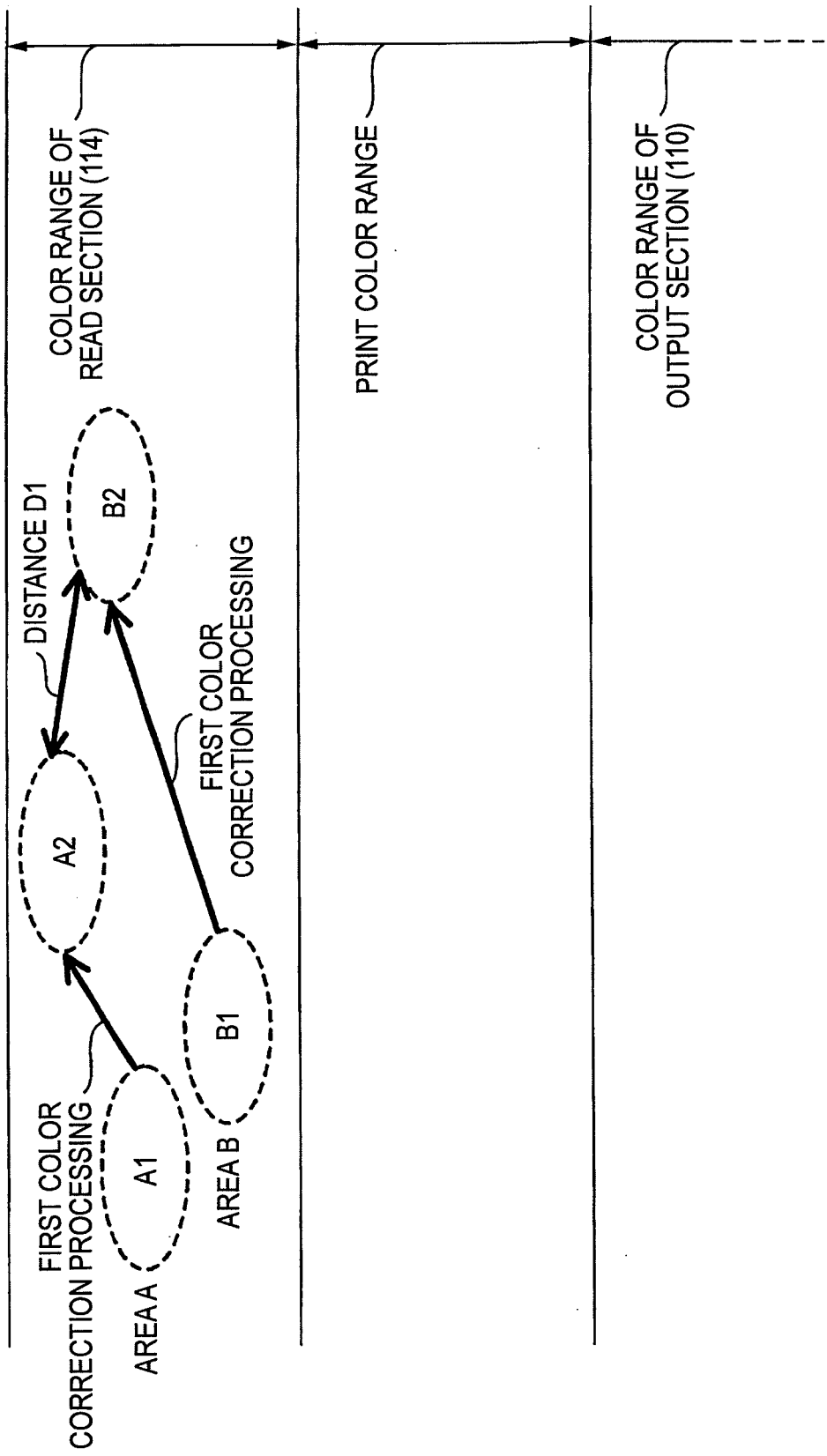

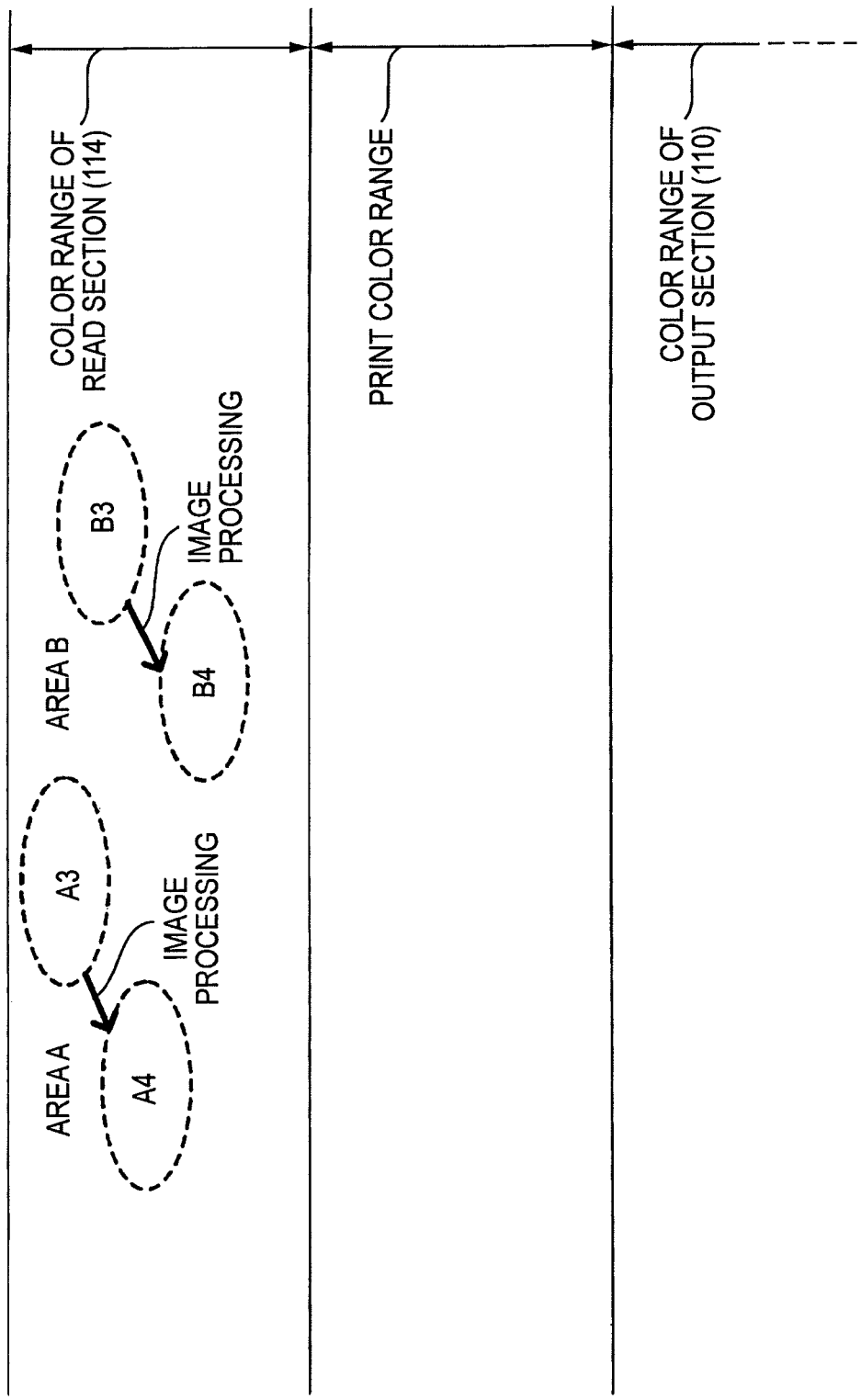

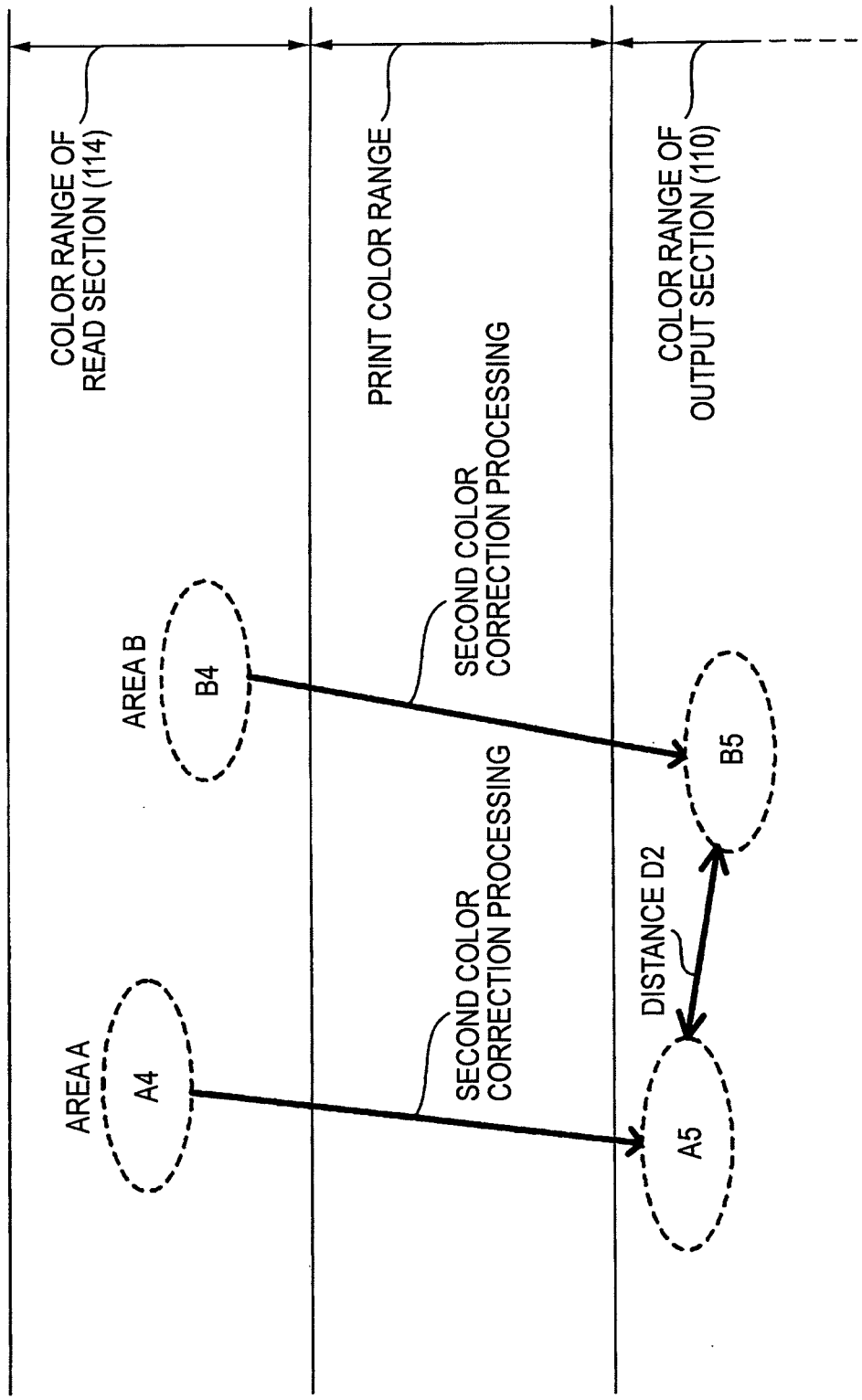

IMAGE PROCESSING APPARATUS AND COMPUTER READABLE MEDIUM

CROSS-REFERENCE TO RELATED APPLICATIONS

This application is based upon and claims priority under 35 USC 119 from Japanese Patent Application No. 2010-134398, filed Jun. 11, 2010.

BACKGROUND

1. Technical Field

This invention relates to an image processing apparatus and a computer readable medium storing a program for processing image data read from a document.

2. Related Art

A translucent fluorescent color may be put on characters written in a pencil or a ballpoint pen to indicate that the characters are important. Pigment used for the fluorescent color absorbs colorless ultraviolet rays contained together with color light in sunlight as energy, becomes an excitation state, changes extra energy to color light having a long wavelength, and emits the color light. The color light emitted at this time is fluorescence. Wave length of the color light reemitted from the pigment depends on kinds of the pigment and difference of the kinds becomes difference in the fluorescent color.

To output an image to a record material based on subtractive color mixture, processing of compressing the color range in which input image data can be reproduced is performed to match gradation indicated by the input image data with the color reproduction area of the record material (color space compression processing). In an image output apparatus for forming a full color image by executing subtractive color mixture using four color materials of a cyan component (C), a magenta component (M), a yellow component (Y), and a black component (K), if a full color document image contains a fluorescent color, texture and fluorescent feeling to the fluorescent color may be lost or fluorescent colors of different kinds may be reproduced in the same color by performing the color space compression processing.

SUMMARY OF THE INVENTION

According to an aspect of the invention, an image processing apparatus includes a read unit and a first correction unit. The read unit reads a document and generates multilevel image data from the document. The first correction unit corrects the multilevel image data contained in a first range predetermined as a color indicating a fluorescent color so as to move the multilevel image data contained in the first range to an outside of a print color range when at least a part of the multilevel image data is contained in the first range.

BRIEF DESCRIPTION OF THE DRAWINGS

Exemplary embodiments of the invention will be described in detail based on the following figures, wherein:

FIG. 2 is a table to illustrate first ranges;

FIG. 3 is a table to show correspondence between the first ranges and first threshold values;

FIG. 4 is a table to illustrate second ranges;

FIG. 5 is a table to show correspondence between the second ranges and second threshold values;

FIG. 7 is an image drawing to further describe the first ranges, the second ranges, the color range, etc.;

FIG. 8A is an enlarged view of a part of the image drawing of FIG. 7;

FIG. 8B is an enlarged view of a part of the image drawing of FIG. 7;

FIG. 8C is an enlarged view of a part of the image drawing of FIG. 7;

DETAILED DESCRIPTION

Embodiments of the invention will be discussed below in detail with reference to the accompanying drawings. The description to follow is only an example for carrying out the invention and the invention is not limited to the items described below and may be changed as appropriate as required.

First Exemplary Embodiment

Figure 1:
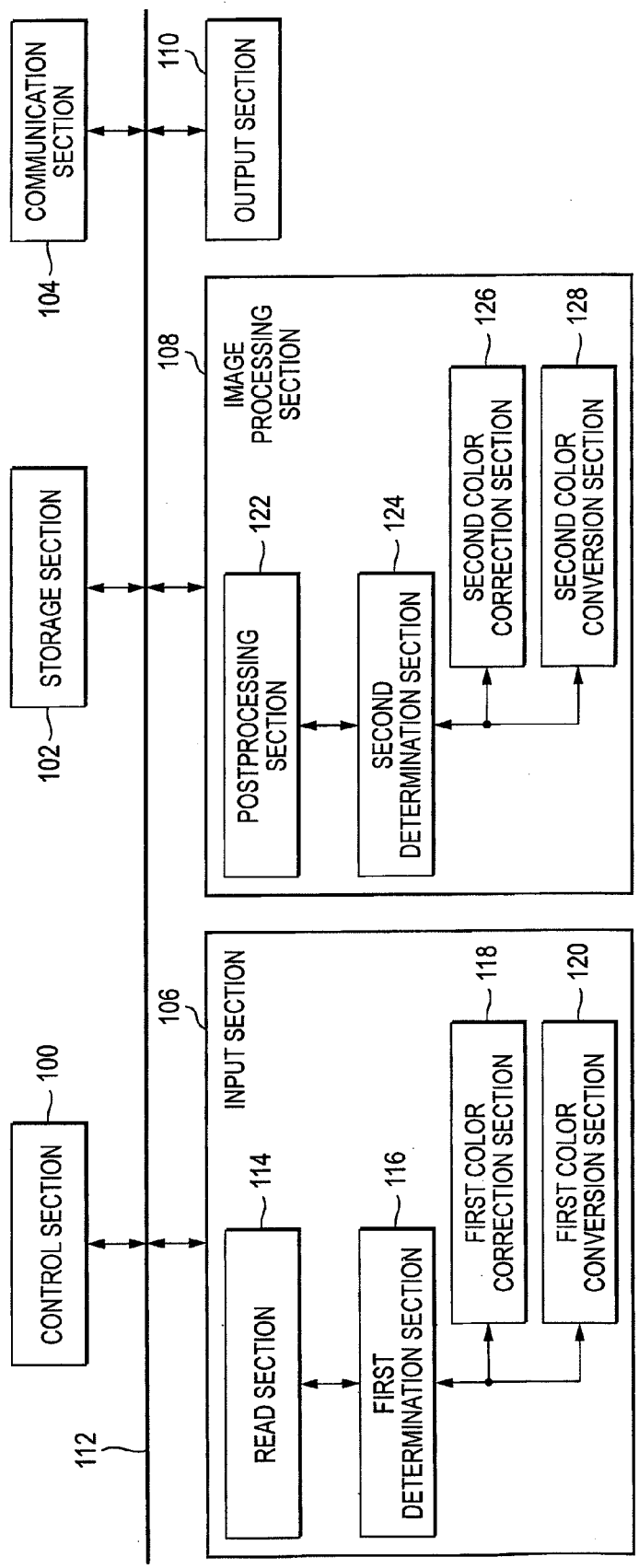
FIG. 1 is a function block diagram of an image processing apparatus according to a first exemplary embodiment of the invention.

FIG. 1 is a function block diagram of an image processing apparatus 1 according to a first exemplary embodiment of the invention.

The image processing apparatus 1 is, for example, a multiple function apparatus having a plurality of functions of copy, print, facsimile transmission, and the like, and is made up of a control section 100, a storage section 102, a communication section 104, an input section 106, an image processing section 108, an output section 110, and a bus 112.

In the accompanying drawings, substantially identical components are denoted by the same reference numerals.

[Control Section, Storage Section, and Communication Section]

The control section 100 is, for example, a CPU and transmits and receives data to and from the storage section 102, the communication section 104, the input section 106, the image processing section 108, and the output section 110 through the bus 112 and controls the sections.

The storage section 102 is storage of ROM, RAM, a hard disk, and the like. The storage section 102 stores, for example, a program operating in the image processing apparatus 1, etc., image data read by a read section 114, image data subjected to various types of image processing by the image processing section 108, a first threshold value, and a second threshold value.

The communication section 104 is, for example, a network interface and transmits the image data subjected to various types of image processing by the image processing section 108 to a different apparatus.

[Input Section]

The input section 106 is, for example, a scanner and reads a document placed on platen glass, etc., and generates image data. The input section 106 is made up of the read section 114, a first determination section 116, a first color correction section 118, and a first color conversion section 120. The first determination section 116, the first color correction section 118, and the first color conversion section 120 may be implemented as programs read from the storage section 102 and operating in the input section 106.

A three-dimensional lookup table may be used to execute color conversion.

The read section 114 is a sensor for sensing color; for example, CCD (Charge Coupled Device) is used. The read section 114 scans a document placed on the platen glass, etc., generates an image signal made up of three primary colors of light of R (Red), G (Green), and B (blue), and outputs the image signal to the determination section 116 as image data (for example, eight-bit (256-level gray scale) digital data) indicating the document.

The first determination section 116 determines whether or not the image data output from the read section 114 contains at least two first ranges. The first range means the preset RGB value range for each of fluorescent colors of predetermined different kinds.

For example, the first range is preset as the RGB value range indicating a fluorescent color as shown in FIG. 2. Here, four first ranges exist.

As shown in FIG. 2, each of the R value and the G value is set to 0 to 10 and the B value is set to 70 to 80 about the fluorescent color of yellow; the R value is set to 0 to 10, the G value is set to 40 to 50, and the B value is set to 90 to 100 about the fluorescent color of orange; the R value is set to 0 to 10, the G value is set to 70 to 80, and the B value is set to 60 to 70 about the fluorescent color of pink; and the R value is set to 70 to 100, the G value is set to 90 to 100, and the B value is set to 20 to 30 about the fluorescent color of purple.

The numeric values are values when 256-level gray scale is provided.

The first determination section 116 in FIG. 1 determines whether or not at least a part (hereinafter, simply "a part") of the image data output from the read section 114 is contained in the first ranges of a predetermined combination of predetermined first ranges. The first determination section 116 in FIG. 1 determines whether or not a part of the image data is contained in the first ranges of a combination of colors easily becoming the same color if print is executed (for example, yellow and orange, purple and pink, a combination of three or more colors).

If a part of the image data is not contained in the first ranges of the predetermined combination, the image data output from the read section 114 is subjected to no processing and is output to the first color conversion section 120.

On the other hand, if a part of the image data is contained, the image data output from the read section 114 is output to the first color correction section 118. The first correction section 118 corrects the image data contained in the first ranges and outputs the image data after subjected to the color correction processing to the first color conversion section 120.

Specifically, the first color correction section 118 corrects the image data contained in the first ranges so that the distance of the image data contained in the first ranges outside a preset print color range (hereinafter "print color range." The print color range is values of color patches previously extracted as colors of general printed matter) in the input section 106 becomes equal to or more than the first threshold value.

The first threshold value is preset so that discrimination of the image data contained in the first ranges is enhanced (namely, the image data pieces contained in the first ranges are at a given distance from each other) and, is stored in the storage section 102.

When a part of the image data is contained in the first ranges indicating the fluorescent colors of yellow and orange, the first color correction section 118 corrects the image data output from the read section in FIG. 1 and contained in the first ranges so that the hue angle difference of the image data outside the print color range and contained in the first range becomes 30 degrees of the first threshold value or more, for example, as shown in FIG. 3.

Similar comments also apply if a part of the image data is contained in the first ranges indicating the fluorescent colors of purple and pink.

Here, it is described that the distance of the image data contained in the first ranges is indicated by the hue angle difference; the distance may be indicated by the saturation difference, etc.

The first color conversion section 120 in FIG. 1 converts image data output from the determination section 116 or the first color correction section 118 into a different color system (for example, CIE L*a*b* color system, another device-independent color system) from the color system read by the read section 114 and outputs the image data after subjected to the color conversion processing to the image processing section 108.

The image data subjected to the first color conversion processing may be stored in the storage section 102 and may be transmitted to a different apparatus through the communication section 104.

Here, it is described that the first color conversion processing is executed after color correction processing by the first color correction section 118 (hereinafter "first color correction processing") in response to the determination result of the first determination section 116; the first color correction processing may be executed at the same time as color conversion processing by the first color conversion section 120 (hereinafter "first color conversion processing") (similar comments also apply to different color correction processing described later).

[Image Processing Section]

The image processing section 108 is implemented as a program read from the storage section 102 and operating in the image processing apparatus 1, for example, and performs various types of image processing for the image data output from the first color conversion section 120. The image processing section 108 is made up of a postprocessing section 122, a second determination section 124, a second color correction section 126, and a second color conversion section 128.

The image data output from the first color conversion section 120 is output to the postprocessing section 122. The postprocessing section 122 further performs image processing (for example, image enhancement, spatial filtering intended for image smoothing, image contour extraction, and the like, gradation conversion processing, etc.,) for the image data output from the first color conversion section 120, and outputs the image data after subjected to the image processing to the second color correction section 126 or the second color conversion section 128 in response to the determination result of the second determination section 124.

The second determination section 124 determines whether or not a part of the image data output from the postprocessing section 122 is contained in second ranges of a predetermined combination of predetermined second ranges. The second range means the preset range of the CIE L*a*b*c values for each of fluorescent colors of predetermined different kinds.

For example, the second range is preset as the range of values indicating a fluorescent color as shown in FIG. 4. Here, four second ranges exist.

If a part of the image data is not contained in the second ranges of the predetermined combination, the image data output from the postprocessing section 122 is subjected to no processing and is output to the second color conversion section 126.

On the other hand, if a part of the image data is contained, the image data output from the postprocessing section 122 is output to the second color correction section 126. The second color correction section 126 corrects the image data output from the postprocessing section 122 and contained in the second ranges and outputs the image data after subjected to the color correction processing to the second color conversion section 128.

Specifically, the second color conversion section 128 corrects the image data contained in the second ranges so that the distance of the image data contained in the second ranges in a preset color range in the output section 110 (hereinafter "color range of output section." The color range of the output section is values of color patches previously extracted as colors reproduced in the output means) becomes equal to or more than the second threshold value. The second threshold value is preset so that discrimination of the image data contained in the second ranges is enhanced (namely, the image data pieces contained in the second ranges are at a given distance from each other), and is stored in the storage section 102.

The image data subjected to the image processing by the postprocessing section 122 may be stored in the storage section 102 and may be transmitted to a different apparatus through the communication section 104. If a part of the image data output from the first color conversion section 120 is contained in the third range indicating a predetermined fluorescent color, the postprocessing section 122 may perform no image processing for the image data contained in the third range (similar comments also apply to modified examples and a second embodiment).

If the image data contains the second ranges indicating the fluorescent colors of yellow and orange, the second color correction section 126 corrects the second ranges contained in the image data output from the postprocessing section 122 (namely, the image data in the color system before the second color conversion processing) so that the hue angle difference in the second ranges in the color range of the output section becomes 20 degrees of the second threshold value or more, for example, as shown in FIG. 5. Similar comments also apply to the case where the image data contains the second ranges indicating the fluorescent colors of purple and pink.

In the postprocessing section 122, if a part of the image data output from the first color conversion section 120 contains the third range and is not subjected to image processing, the image data contained in the third range is corrected so as to move the image data contained in the third range in the print color range (similar comments also apply to modified examples and a second embodiment).

The second color conversion section 128 converts the image data output from the postprocessing section 122 or the second color correction section 126 into a different color system (for example, YMCK (Yellow, Magenta, Cyan, Key plate) color system) from the color system read by the read section 114 and the display system after the first color conversion processing, and outputs the image data to the output section 110.

The image data subjected to color conversion processing by the second color conversion section 128 (hereinafter, "second color conversion processing") may be stored in the storage section 102 and may be transmitted to a different apparatus through the communication section 104.

[Output Section]

The output section 10 is, for example, a printer and prints the image data output from the second color correction section 126 on a sheet.

The output section 10 includes an image forming unit made up of a photoconductive drum, a charging section, an exposure section, a developing section, and transfer section for each toner (for example, yellow, magenta, cyan, and black (key plate).

The photoconductive drum is a drum-like device rotating at given speed with a shaft as the center and is charged to a given potential by the charging section. The exposure section applies laser light to the charged photoconductive drum to form an electrostatic latent image. The developing section deposits toner on the electrostatic latent image formed on the photoconductive drum to develop a toner image. The transfer section transfers the toner image developed on the photoconductive drum to a sheet conveyed from a sheet feed tray, etc. The sheet to which the toner image is transferred by the transfer section is discharged to a discharge tray, etc.

Figure 6:
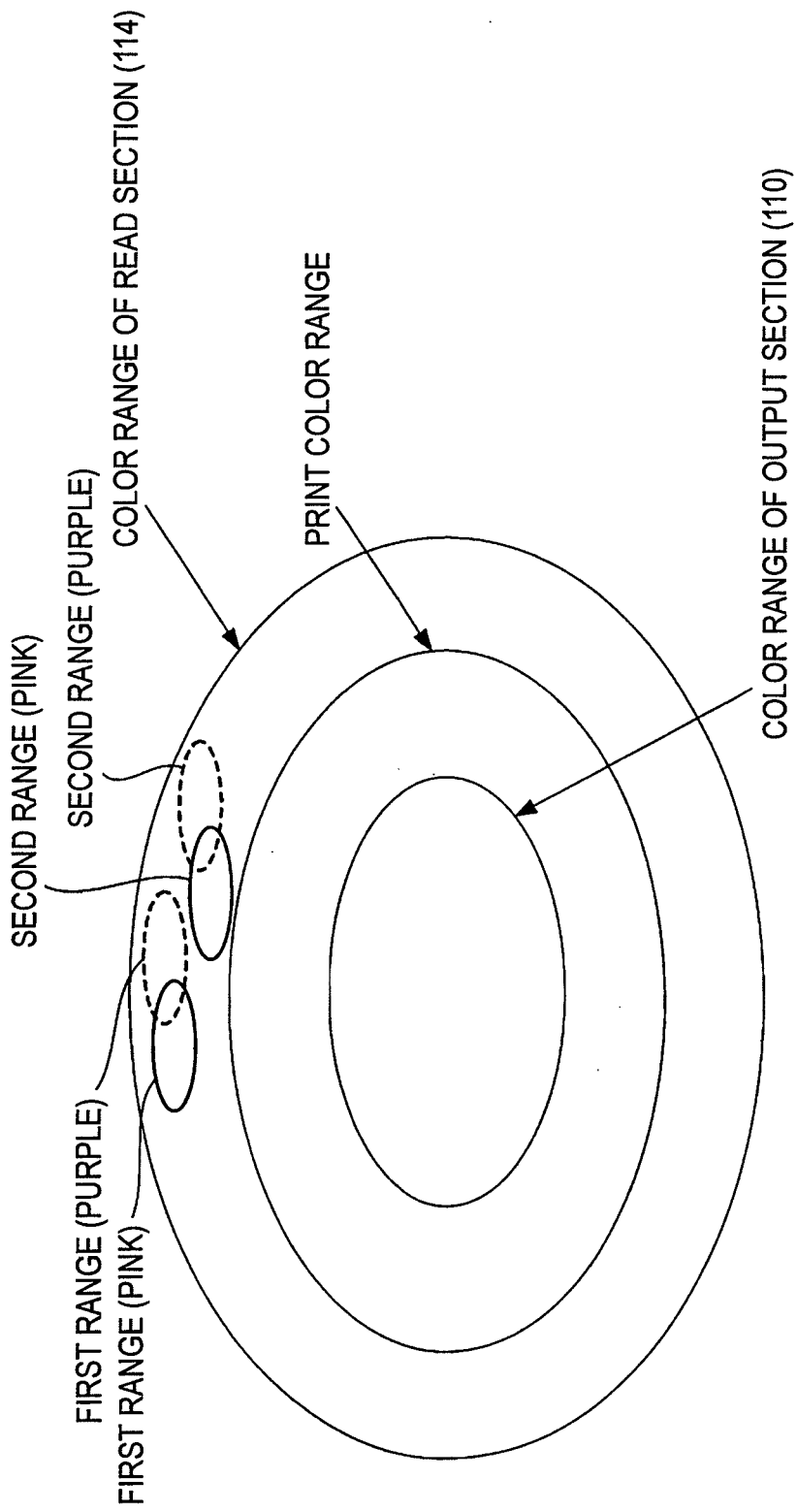
FIG. 6 is an image drawing to further describe the first ranges, the second ranges, the color range, etc.

FIG. 6 is an image drawing to further describe the first ranges, the second ranges, the print color range, and the color range of the output section previously described with reference to FIG. 1.

As shown in FIG. 6, a predetermined color range in the read section 114 in FIG. 1 (hereinafter "color range of read section"), the print color range, the color range of the output section are shown each as an ellipse area; the print color range contains the color range of the output section and the color range of the read section contains the print color range.

The first range and the second range are set outside the print color range and inside the color range of the read section. Here, the first ranges and the second ranges indicating the fluorescent colors of two kinds of pink and purple are set.

The color range of the read section, the print color range, and the color range of the output section do not necessarily correspond to the RGB color system, the CIE L*a*b* color system, and the YMCK display color and may be represented by the same color system. A part of the color range of the output section may not be contained in the print color range and a part of the print color range may not be contained in the color range of the read section.

It is assumed that the image data (RGB value) read by the read section is distributed to areas A to E as shown in FIG. 7.

FIG. 8 is an enlarged view of a part of the image drawing of FIG. 7.

As shown in FIG. 8A, if areas corresponding to different first ranges exist in the image data read by the read section 114 in FIG. 1 (here, area A corresponds to pink and the area B corresponds to purple), first color correction processing indicated by an arrow is performed so that distance D1 between the areas in the color range of the read section (outside the print color range) becomes the first threshold value or more. The area A moves from an initial position A1 to A2 and the area B moves from an initial position B1 to B2 by performing the first color correction processing.

As shown in FIG. 8A, the positions A2 and B2 after the first color correction processing position in the outer edge of the color range of the read section and position outside the print color range as compared with the positions A1 and B1 before the first color correction processing. The outer edge of the color range means a portion at a distance from the center of the color range in the inner portion of the color range.

The first color correction processing is not performed for areas other than the areas corresponding to the different first ranges (here, areas C to E in FIG. 7) in the image data read by the read section 114 in FIG. 1. If areas corresponding to the different first ranges do not exist, the first color correction processing is not performed (similar comments also apply to any other correction processing).

As shown in FIG. 8B, after the first color correction processing shown in FIG. 8A is performed, first color conversion processing is performed for the areas A and B. The first color conversion processing is performed, whereby the area A moves from the position A2 after the first color correction processing to A3, and the position B moves from the position B2 after the first color correction processing to B3. Further, image processing is performed for the areas A and B and the areas move to positions A4 and B4 indicated by arrows.

As shown in FIG. 8C, if areas corresponding to different second ranges exist in the image data output from the postprocessing section 122 in FIG. 1 (here, area A positioning at A4 corresponds to pink and the area B positioning at B4 corresponds to purple), second color correction processing indicated by an arrow is performed so that distance D2 between the areas in the color range of the output section (outside the print color range) becomes the second threshold value or more. The area A moves from the position A4 to A5 and the area B moves from the position B4 to B5 by performing the second color correction processing.

As shown in FIG. 8C, the positions A5 and B5 after the second color correction processing position in the outer edge of the color range of the read section and position outside the print color range as compared with the positions A4 and B4 before the second color correction processing. Further, although not shown, second color conversion processing is performed for the areas A and B.

Thus, if a part of the image data read by the read section 114 in FIG. 1 is contained in the first ranges and the second ranges of predetermined combinations, color correction processing is performed for the image data contained in the first ranges and the second ranges before the color conversion processing and the image processing, and the image data contained in the first ranges and the second ranges is kept at a given distance, whereby discrimination of the image data contained in the first ranges and the second ranges can be enhanced.

The image data contained in the first ranges and the second ranges is kept at a predetermined distance before the color conversion processing and the image processing, whereby intended reproducibility can be maintained even after the color conversion processing and the image processing (particularly, character enhancement, etc.,).

Although it is described that the color correction processing is performed before the color conversion processing and the image processing, no image processing may be performed. This means that the color correction processing may be performed before only the color conversion processing is performed (similar comments also apply to modified examples and a second embodiment).

Figure 9:
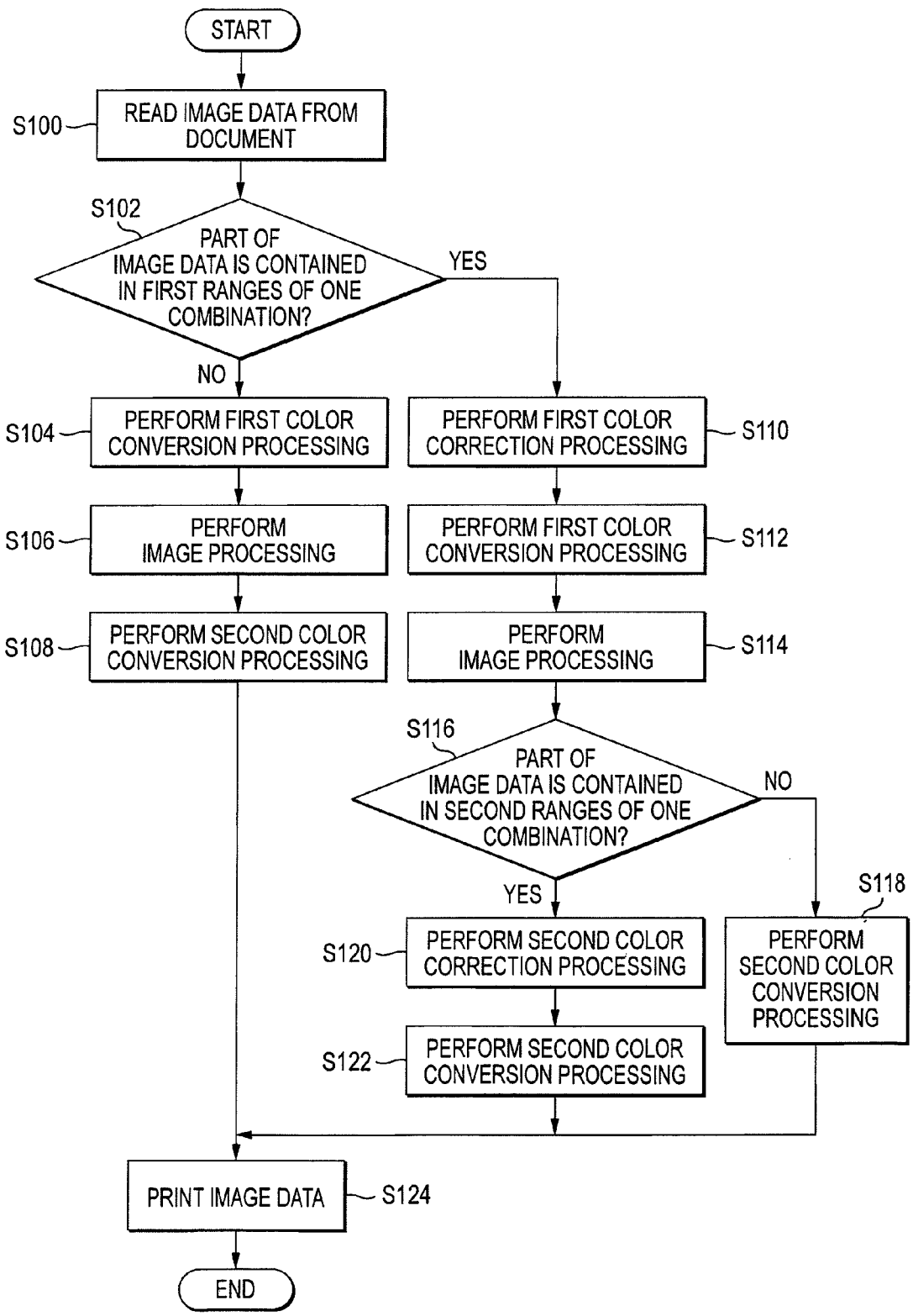
FIG. 9 is a flowchart to show the general operation of the image processing apparatus according to the first exemplary embodiment of the invention.

FIG. 9 is a flowchart to show the general operation of the image processing apparatus 1 according to the first exemplary embodiment of the invention.

As shown in FIG. 9, at step 100 (S100), the read section 114 in FIG. 1 reads a document placed on the platen glass, etc., and generates image data from the read document.

At step 102 (S102), the first determination section 116 in FIG. 1 determines whether or not a part of the image data generated at step 100 is contained in the first ranges of a predetermined combination. If a part of the image data is not contained in the first ranges, the process goes to step 104; if a part of the image data is contained, the process goes to step 110.

At step 104 (S104), the first color conversion section 120 in FIG. 1 performs color conversion processing for the image data generated at step 100.

At step 106 (S106), the postprocessing section 122 in FIG. 1 performs image processing for the image data subjected to the color conversion processing at step 104.

At step 108 (S108), the second color conversion section 128 in FIG. 1 performs color conversion processing for the image data subjected to the image processing at step 106. At step 110 (S110), the first color correction section 118 in FIG. 1 performs color correction processing for the image data generated at step 100 and contained in the first ranges.

At step 112 (S112), the first color conversion section 120 in FIG. 1 performs color conversion processing for the image data subjected to the color correction processing at step 110.

At step 114 (S114), the postprocessing section 122 in FIG. 1 performs image processing for the image data subjected to the color conversion processing at step 112. As described above, if a part of the image data after subjected to the processing at step 112 is contained in the third range, the image processing may be skipped for the image data contained in the third range.

At step 116 (S116), the second determination section 124 in FIG. 1 determines whether or not a part of the image data subjected to the image processing at step 114 is contained in the second ranges of a predetermined combination. If a part of the image data is not contained in the second ranges, the process goes to step 118; if a part of the image data is contained, the process goes to step 120.

At step 118 (S118), the second color conversion section 128 in FIG. 1 performs color conversion processing for the image data subjected to the image processing at step 114.

At step 120 (S120), the second color correction section 126 in FIG. 1 performs color correction processing for the image data subjected to the image processing at step 114 and contained in the second ranges.

At step 122 (S122), the second color conversion section 128 in FIG. 1 performs color conversion processing for the image data subjected to the color correction processing at step 120.

At step 124 (S124), the output section 110 in FIG. 1 prints the image data subjected to the color conversion processing at steps 108, 118, and 122, and the processing is terminated.

MODIFIED EXAMPLE

FIG. 10 is function block diagrams of modified examples of the image processing apparatus shown in FIG. 1.

Image processing apparatus shown in FIGS. 10A to 10D differ from the image processing apparatus in FIG. 1 in the configuration of input section 106, the configuration of image processing section 108, and the presence or absence of output section 110.

Modified Example 1

Figure 10A:
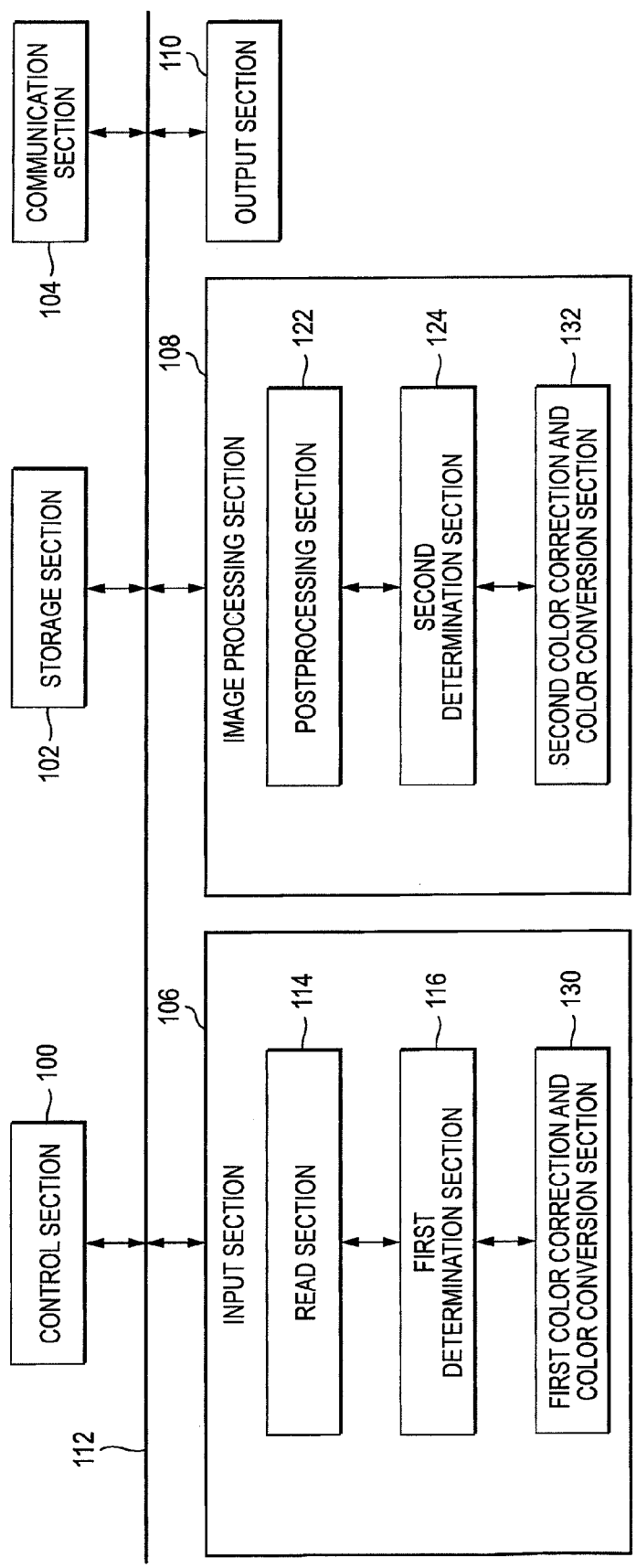
FIG. 10A is a function block diagram of a modified example of the image processing apparatus shown in FIG. 1.

As shown in FIG. 10A, in an input section 106, the first color correction section 118 and the first color conversion section 120 shown in FIG. 1 may be integrated into a first color correction and color conversion section 130 and first color correction processing and first color conversion processing may be executed at the same time.

In an image processing section 108, the second color correction section 126 and the second color conversion section 128 shown in FIG. 1 may be integrated into a second color correction and color conversion section 132 and second color correction processing and second color conversion processing may be executed at the same time.

Figure 10B:
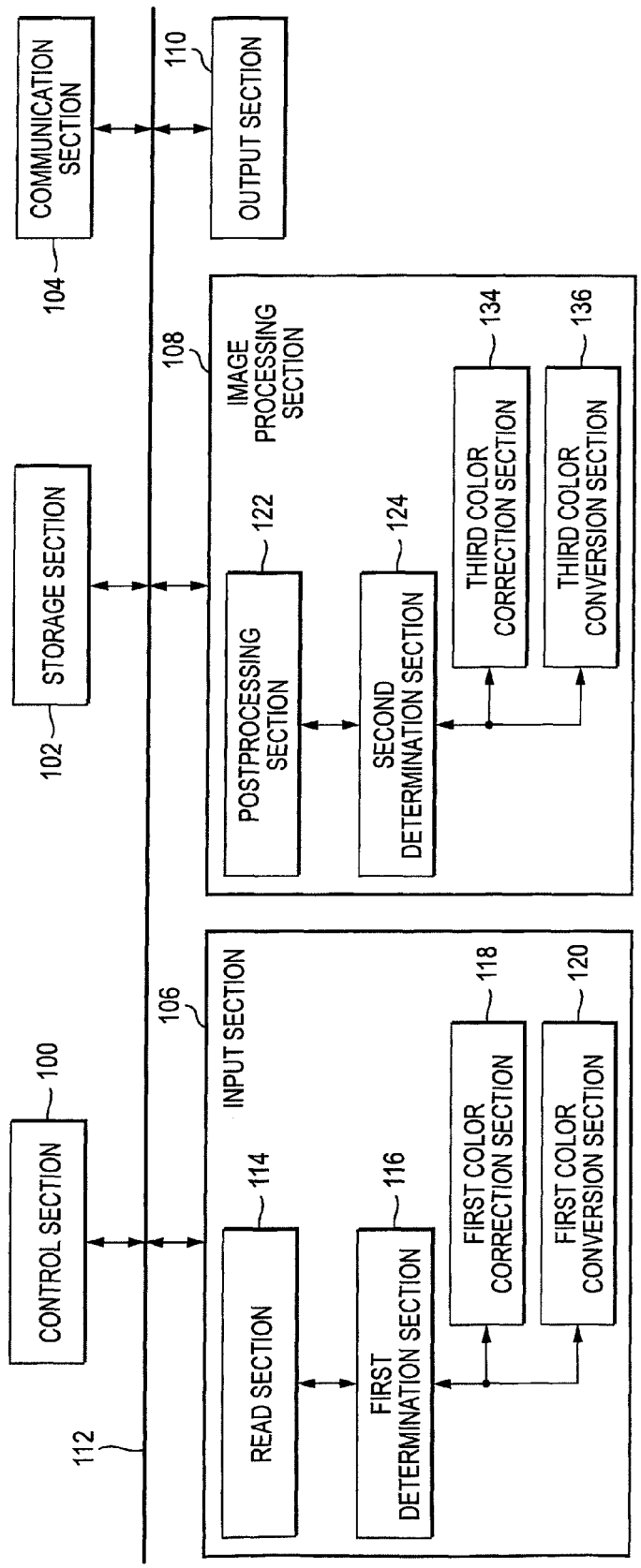
FIG. 10B is a function block diagram of a modified example of the image processing apparatus shown in FIG. 1.
Figure 10C:
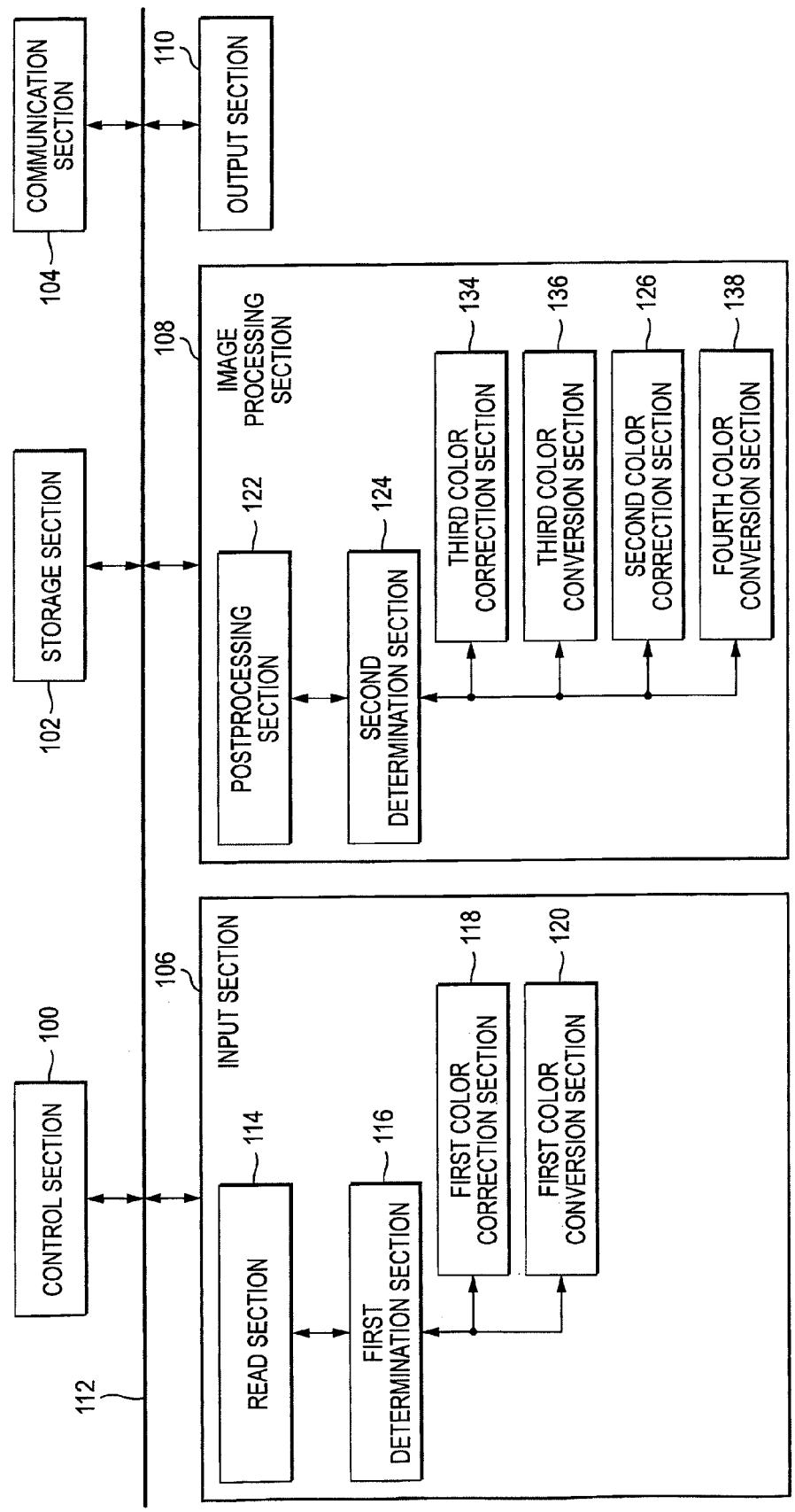
FIG. 10C is a function block diagram of a modified example of the image processing apparatus shown in FIG. 1.

As shown in FIG. 10B, in an image processing section 108, a third color correction section 134 and a third color conversion section 136 may be provided in place of the second color correction section 126 and the second color conversion section 128 shown in FIG. 1. For example, such a configuration is adopted to process image data in a JPEG format.

The third color correction section 134 corrects image data contained in the second ranges so that the distance between the image data pieces contained in the second ranges in the print color range becomes a third threshold value or more. The third threshold value is preset so that discrimination of the image data contained in the second ranges is enhanced (namely, the image data pieces contained in the second ranges are at a given distance from each other) and, is stored in a storage section 102.

The third color conversion section 136 converts image data in an RGB color system into a YCbCr color system.

Modified Example 3

As shown in FIG. 10O, in an image processing section 108, the third color correction section 134 and the third color conversion section 136 shown in FIG. 10B may be provided at the preceding stage of the second color correction section 126 shown in FIG. 1 and a fourth color conversion section 138 may be provided in place of the second color conversion section 128 shown in FIG. 1. For example, such a configuration is adopted to print image data and process the image data to a JPEG format.

The second color correction section 126 corrects second ranges contained in the image data so that the distance between the second ranges contained in the image data becomes a fourth threshold value or more. The fourth threshold value is preset so that discrimination of the second ranges contained in the image data after subjected to fourth color conversion processing is enhanced (namely, the second ranges contained in the image data after subjected to the fourth color conversion processing are at a given distance from each other) and, is stored in a storage section 102.

The fourth color conversion section 138 converts image data in the YCbCr color system into a YMCK color system.

Second Embodiment

Figure 11:
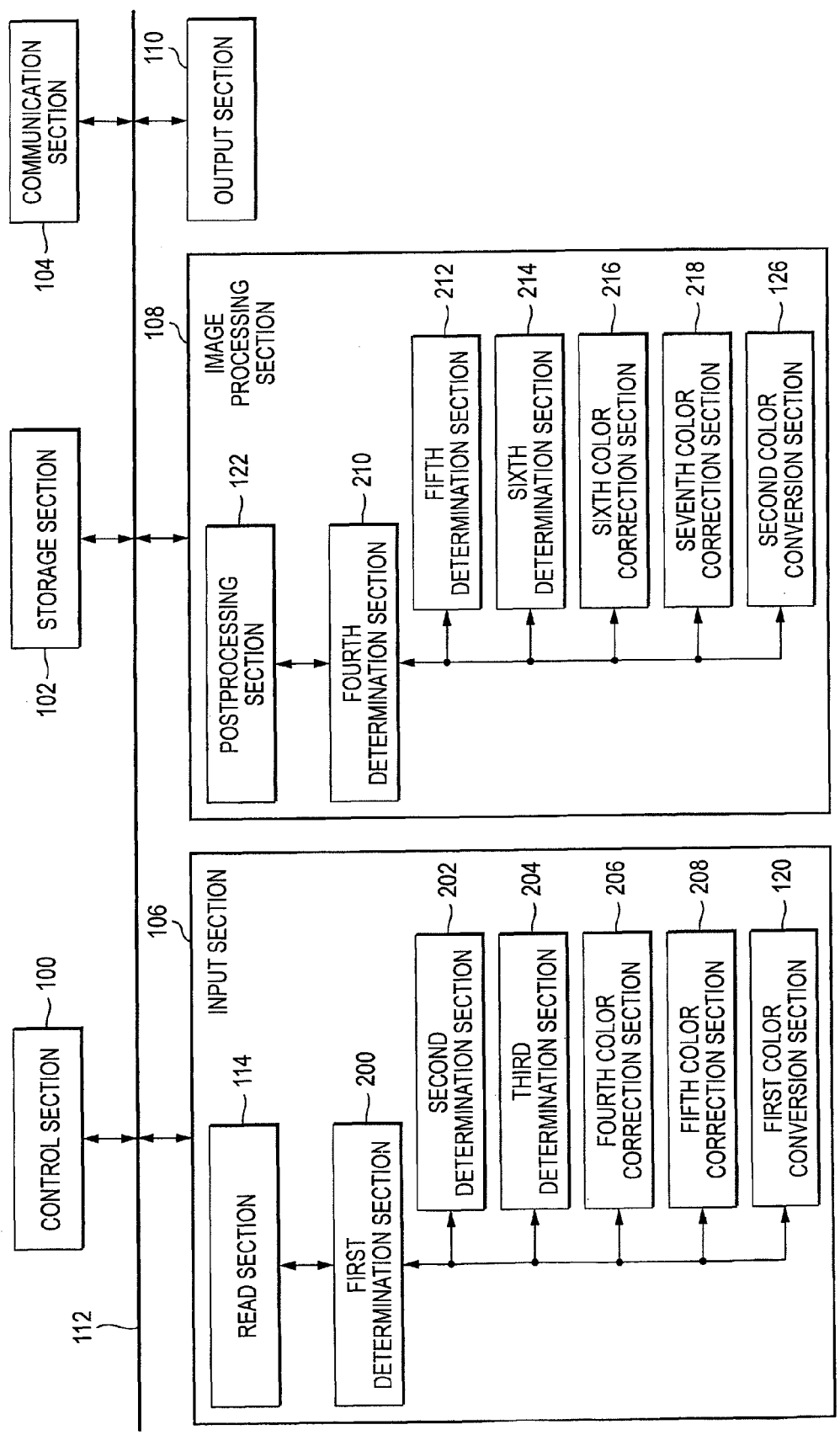
FIG. 11 is a function block diagram of an image processing apparatus according to a second exemplary embodiment of the invention.

FIG. 11 is a function block diagram of an image processing apparatus 2 according to a second exemplary embodiment of the invention.

The image processing apparatus 2 shown in FIG. 11 differs from the image processing apparatus 1 shown in FIG. 1 in storage contents of storage section 102 and the configurations of input section 106 and image processing section 108.

The storage section stores correction amounts in first color correction processing and second color correction processing in association with image data subjected to first color correction processing and second color correction processing in addition to the storage contents of the storage section 102 in FIG. 1 (for example, the programs operating in the image processing apparatus, etc., the image data read by the read section 114, the image data subjected to various types of image processing by the image processing section 108, and the first to fourth threshold values).

As shown in FIG. 11, the input section 106 is made up of a first determination section 200, a second determination section 202, a third determination section 204, a fourth color correction section 206, and a fifth color correction section 208 in addition to a read section 114 and a first color conversion section 120.

The image processing section 108 is made up of a fourth determination section 210, a fifth determination section 212, a sixth determination section 214, a sixth color correction section 216, and a seventh color correction section 218 in addition to a postprocessing 122 and a second color conversion section 126.

The first determination section 200 determines whether or not a part of the image data output from the read section 114 is contained in at least any of first ranges. The first determination section 200 determines whether or not a part of the image data is contained in the first ranges indicating fluorescent colors of yellow, orange, purple, and pink.

If a part of the image data is contained in none of the first ranges, the image data output from the read section 114 is not subjected to processing and is output to the first color conversion section 120.

On the other hand, if a part of the image data is contained in any of the first ranges, the image data output from the read section 114 is output to the second determination section 202.

The second determination section 202 determines whether or not a part of the image data output from the read section 114 is contained in a first intermediate range.

The first intermediate range is a range positioned between the image data contained in the first color ranges and the range nearest to the image data in a print color range (hereinafter, "first peripheral range").

The distance between the ranges is indicated by a hue angle difference, a saturation difference, etc.; the distance from the first intermediate range to the image data contained in the first ranges and the distance from the first intermediate range to the first peripheral range do not necessarily equal. The image data contained in the first color range is read from the storage section 102.

If a part of the image data is not contained in the first intermediate range, the image data output from the read section 114 is subjected to no processing and is output to the first color conversion section 120.

On the other hand, if a part of the image data is contained, the image data output from the read section 114 is output to the third determination section 204.

Like the determination section 116 in FIG. 1, the third determination section 204 determines whether or not a part of the image data output from the read section 114 is contained in the first ranges of a predetermined combination of predetermined first ranges. If a part of the image data is not contained in the first ranges of the predetermined combination, the image data output from the read section 114 is output to the fourth color correction section 206.

On the other hand, if a part of the image data is contained, the image data output from the read section 114 is output to the fifth color correction section 208.

The fourth color correction section 206 corrects the image data contained in the first ranges and the image data contained in the first intermediate range and outputs the image data after subjected to the color correction processing to the first color conversion section 120.

Specifically, the fourth color correction section 206 corrects the image data contained in the first ranges in a predetermined correction amount (for example, the correction amount in the first color correction processing) and corrects the image data contained in the first intermediate range in response to the position of the intermediate range (for example, the distance from the first intermediate range to the image data contained in the first color ranges or the distance from the first intermediate range to the first peripheral range).

For example, the fourth color correction section 206 corrects the image data contained in the first intermediate range in the correction amount resulting from multiplying the correction amount in correcting the image data contained in the first range by a value weighted so as to be proportional to the distance from the first intermediate range to the image data contained in the first color ranges (the larger the distance, the greater the value). The image data contained in the first intermediate range may be corrected in the correction amount resulting from multiplying the correction amount in correcting the image data contained in the first range by a value weighted so as to be inversely proportional to the distance from the first intermediate range to the first peripheral range (the larger the distance, the smaller the value).

Figure 12:
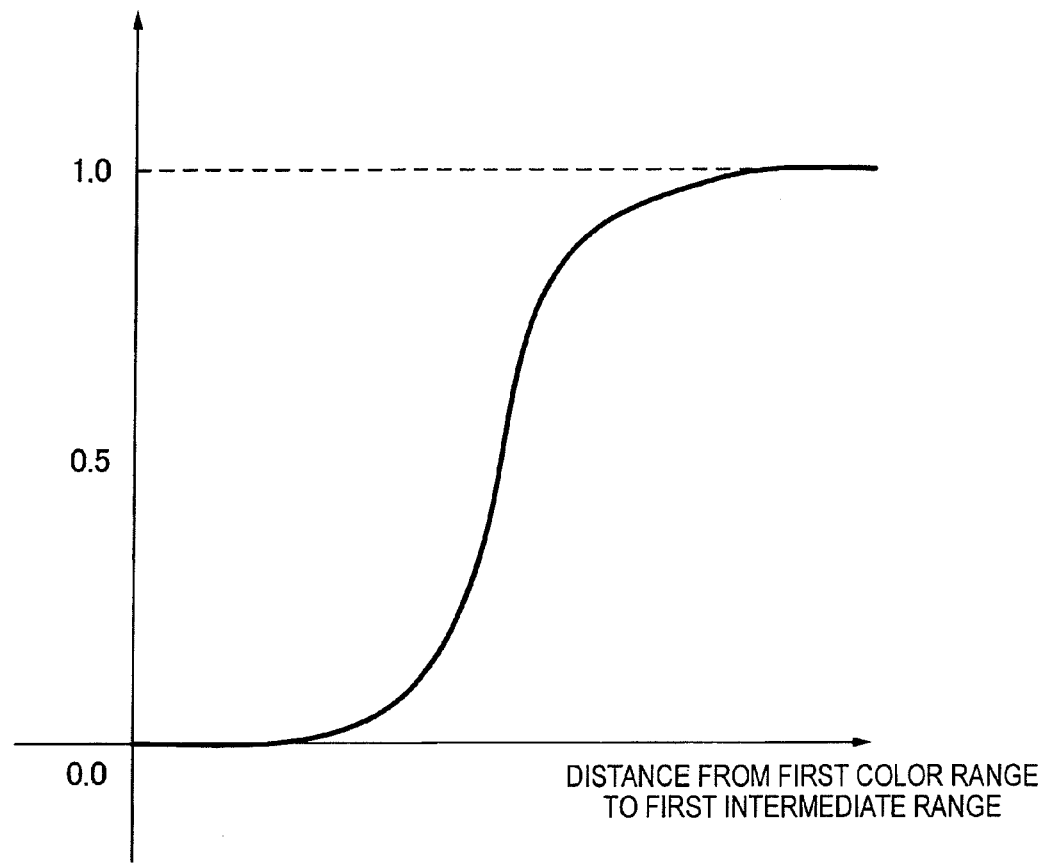
FIG. 12 is a drawing to show the relationship between weight value and the distance from first ranges to an intermediate range.

For example, the fourth color correction section 206 may correct the image data contained in the first intermediate range so as to become a composite value provided by combining the image data contained in the first color ranges and the first peripheral range at the ratio responsive to the distance from the first intermediate range to the image data contained in the first color ranges and the distance from the first intermediate range to the first peripheral range as shown in FIG. 12.

The ratio of combining the image data contained in the first color ranges and the first peripheral range can be changed in response to the use situation of the image processing apparatus 2 (for example, a measure of gradation jump is allowed, no gradation jump is caused to occur as much as possible).

The fifth color correction section 208 includes both the function of the first color correction 118 and the function of the fourth color correction section 206.

That is, the fifth color correction section 208 corrects a color specification value so that the distance between the image data pieces contained in the first ranges outside the print color range becomes the first threshold value or more.

The image data contained in the first intermediate range is corrected in response to the distance from the first intermediate range to the image data contained in the first color ranges or the distance from the first intermediate range to the first peripheral range.

The fourth determination section 210 determines whether or not a part of image data output from the postprocessing 122 is contained in at least any of second ranges. The fourth determination section 210 determines whether or not a part of the image data is contained in the second ranges indicating the fluorescent colors of yellow, orange, purple, and pink, for example.

If a part of the image data is contained in none of the second ranges, the image data output from the postprocessing 122 is not subjected to processing and is output to the second color conversion section 126.

On the other hand, if a part of the image data is contained, the image data output from the read section 114 is output to the fifth determination section 212.

The fifth determination section 212 determines whether or not a part of the image data output from the postprocessing 122 is contained in a second intermediate range.

The second intermediate range is a range positioned between the image data contained in the second color ranges and the range nearest to the image data in a print color range (hereinafter, "second peripheral range").

The distance between the ranges is indicated by a hue angle difference, a saturation difference, etc.; the distance from the second intermediate range to the image data contained in the second ranges and the distance from the second intermediate range to the second peripheral range do not necessarily equal. The image data contained in the second color range is read from the storage section 102.

If a part of the image data is not contained in the second intermediate range, the image data output from the postprocessing 122 is subjected to no processing and is output to the second color conversion section 126.

On the other hand, if a part of the image data is contained, the image data output from the postprocessing 122 is output to the sixth determination section 214.

Like the second determination section 124 in FIG. 1, the sixth determination section 214 determines whether or not a part of the image data output from the postprocessing 122 is contained in the second ranges of a predetermined combination of predetermined second ranges.

If a part of the image data is not contained in the second ranges of the predetermined combination, the image data output from the postprocessing 122 is output to the sixth color correction section 206.

On the other hand, if a part of the image data is contained, the image data output from the postprocessing 122 is output to the seventh color correction section 218.

The sixth color correction section 216 corrects the image data contained in the second ranges and the image data contained in the second intermediate range and outputs the image data after subjected to the color correction processing to the second color conversion section 126.

Specifically, the sixth color correction section 216 corrects the image data contained in the second ranges in a predetermined correction amount (for example, the correction amount in the second color correction processing) and corrects the image data contained in the second intermediate range in response to the position of the intermediate range (for example, the distance from the second intermediate range to the image data contained in the second color ranges or the distance from the second intermediate range to the second peripheral range).

For example, the sixth color correction section 216 corrects the image data contained in the second intermediate range in the correction amount resulting from multiplying the correction amount in correcting the image data contained in the second range by a value weighted so as to be proportional to the distance from the second intermediate range to the image data contained in the second color ranges (the larger the distance, the greater the value). The image data contained in the second intermediate range may be corrected in the correction amount resulting from multiplying the correction amount in correcting the image data contained in the second range by a value weighted so as to be inversely proportional to the distance from the second intermediate range to the second peripheral range (the larger the distance, the smaller the value).

For example, like the fourth color correction section 206, the sixth color correction section 216 may correct the image data contained in the second intermediate range so as to become a composite value provided by combining the image data contained in the second color ranges and the second peripheral range at the ratio responsive to the distance from the second intermediate range to the image data contained in the second color ranges and the distance from the second intermediate range to the second peripheral range.

The ratio of combining the image data contained in the second color ranges and subjected to the second color correction processing and the peripheral range can be changed in response to the use situation of the image processing apparatus 2 (for example, a measure of gradation jump is allowed, no gradation jump is caused to occur as much as possible).

The seventh color correction section 218 includes both the function of the second color correction 126 in FIG. 1 and the function of the sixth color correction section 216.

That is, the seventh color correction section 218 corrects a color specification value so that the distance between the image data pieces contained in the second ranges within the color range of the output section becomes the second threshold value or more.

The image data contained in the second intermediate range is corrected in response to the distance from the second intermediate range to the image data contained in the second color ranges or the distance from the second intermediate range to the second peripheral range.

Figure 13:
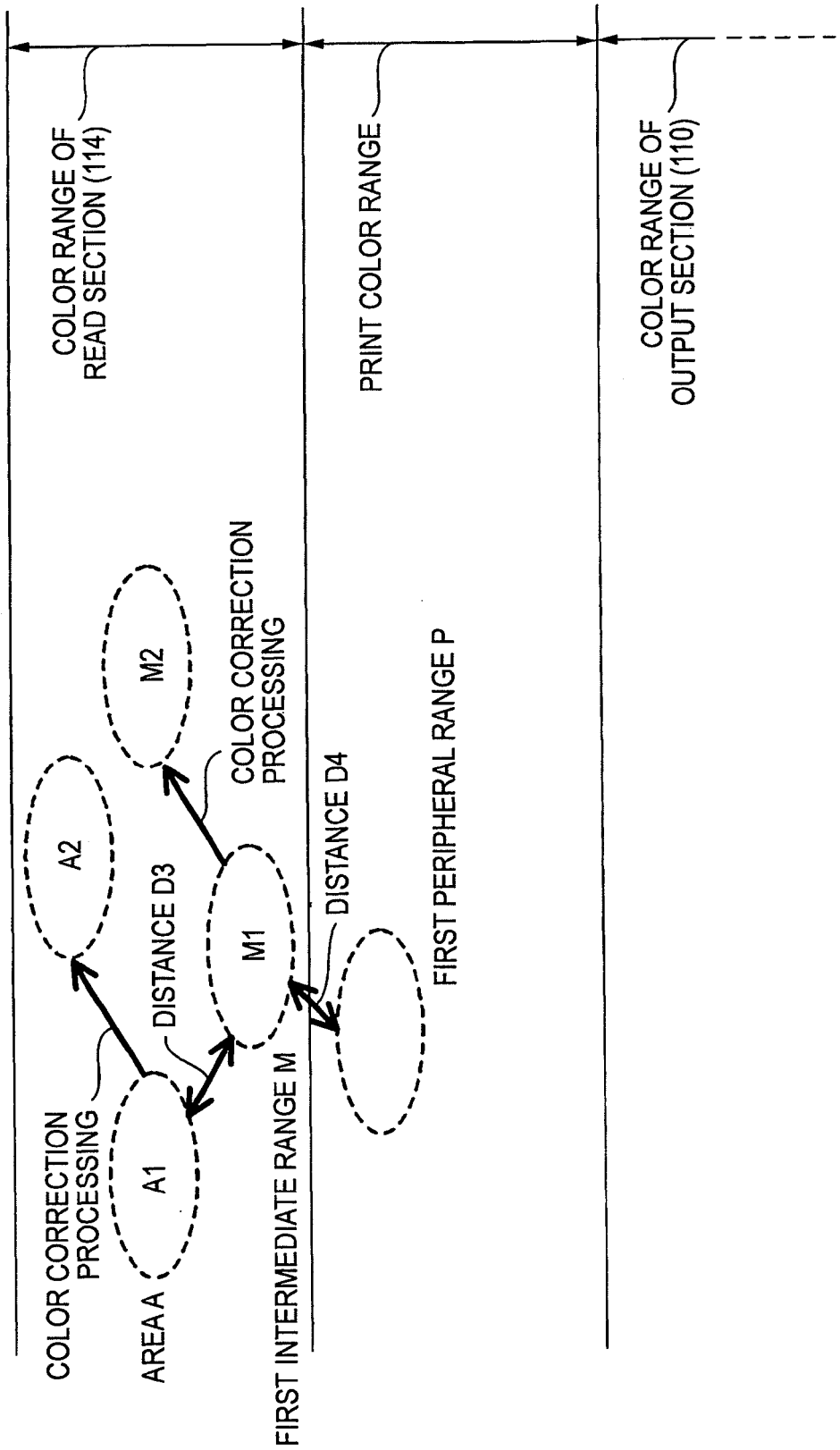
FIG. 13 is an image drawing to further describe the determination executed in a second determination section previously described with reference to FIG. 11.

FIG. 13 is an image drawing to further describe the determination executed in the second determination section 202 previously described with reference to FIG. 11. The determination executed in the fifth determination section 212 in FIG. 11 is similar to the determination executed in the second determination section 202 and therefore will not be discussed.

As shown in FIG. 13, as with FIG. 7, the read data read by the read section 114 in FIG. 11 is distributed to the color range of the read section, the print color range, and the color range of the output section and an area corresponding to at least any of predetermined first ranges exists in the read data read by the read section 114 (here, an area A corresponds to pink).

The second determination section 202 reads the area A (here, the area A positioned at an initial position A1) from the storage section 102 in FIG. 11 and acquires peripheral range P.

Further, the second determination section 202 determines whether or not a part of the image data output from the read section 114 in FIG. 11 is contained in an intermediate range M positioned between the area A positioned at the initial position A1 and the peripheral range P.

As described above, if a part of the image data is contained in the intermediate range M, the fourth color correction section 206 in FIG. 11 corrects the image data contained in the area A and also corrects the image data contained in the intermediate range M in response to a distance between the area A and the intermediate range M or a distance D4 between the intermediate range M and the peripheral area P. After the color correction processing, the area A moves from the initial position A1 to A2 and the intermediate range M moves from the initial position A1 at the distance provided by multiplying the move distance from A1 to A2 by a value of weighting responsive to D3 or D4 and moves to M2.

Thus, a part of the image data output from the read section 114 in FIG. 11 is contained in the intermediate range, gradation jump occurring between the image data contained in the first ranges and the second ranges and the peripheral range after first color correction processing and the second color correction processing can be controlled by color correction processing performed by the fourth color correction section 206 in FIG. 11 for the image data contained in the intermediate range ("fourth color correction processing") and color correction processing performed by the fifth color correction section 208 for the image data contained in the intermediate range ("fifth color correction processing").

Figure 14:
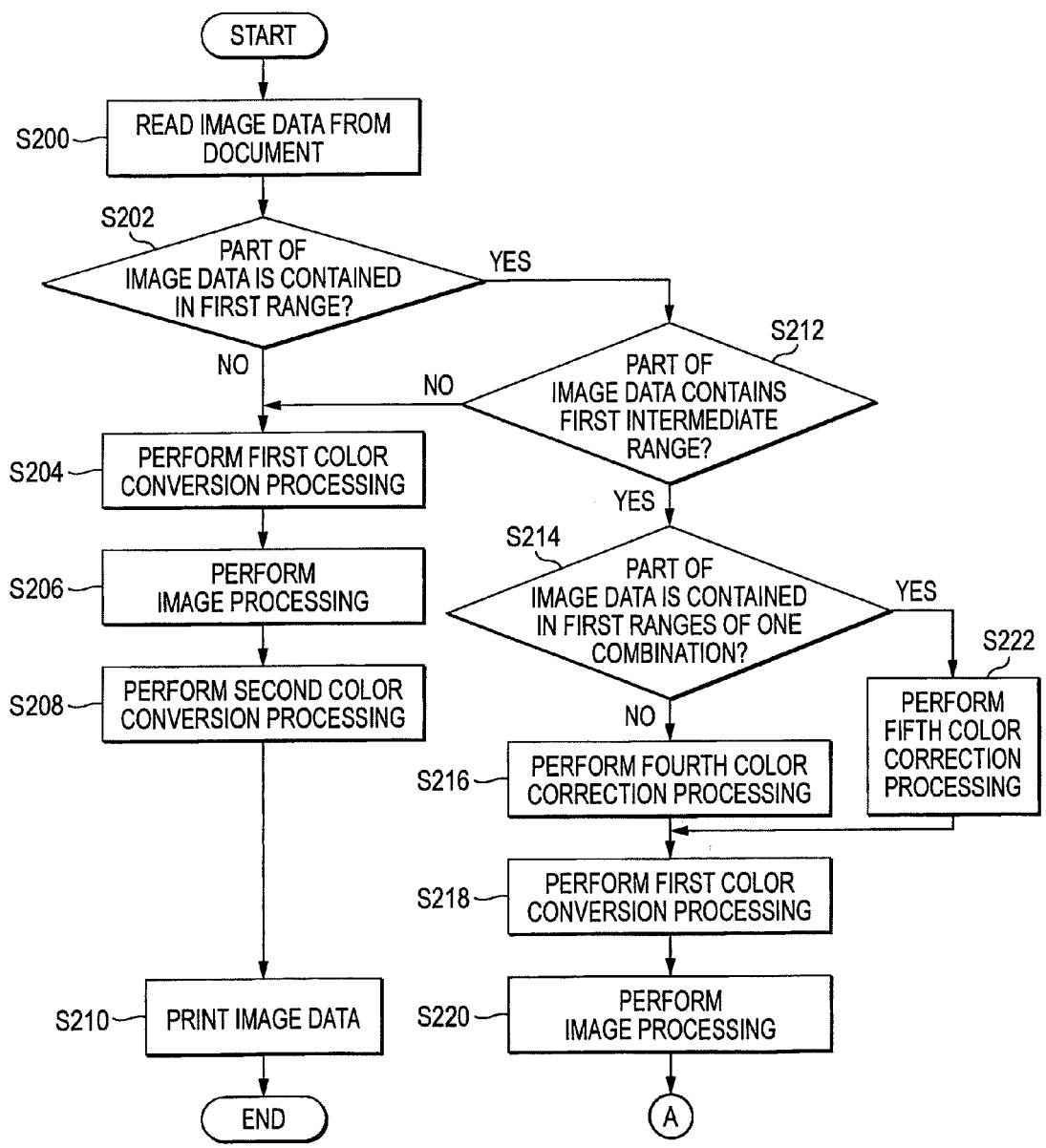
FIG. 14 is a flowchart to show the general operation of the image processing apparatus according to the second exemplary embodiment of the invention.
Figure 15:
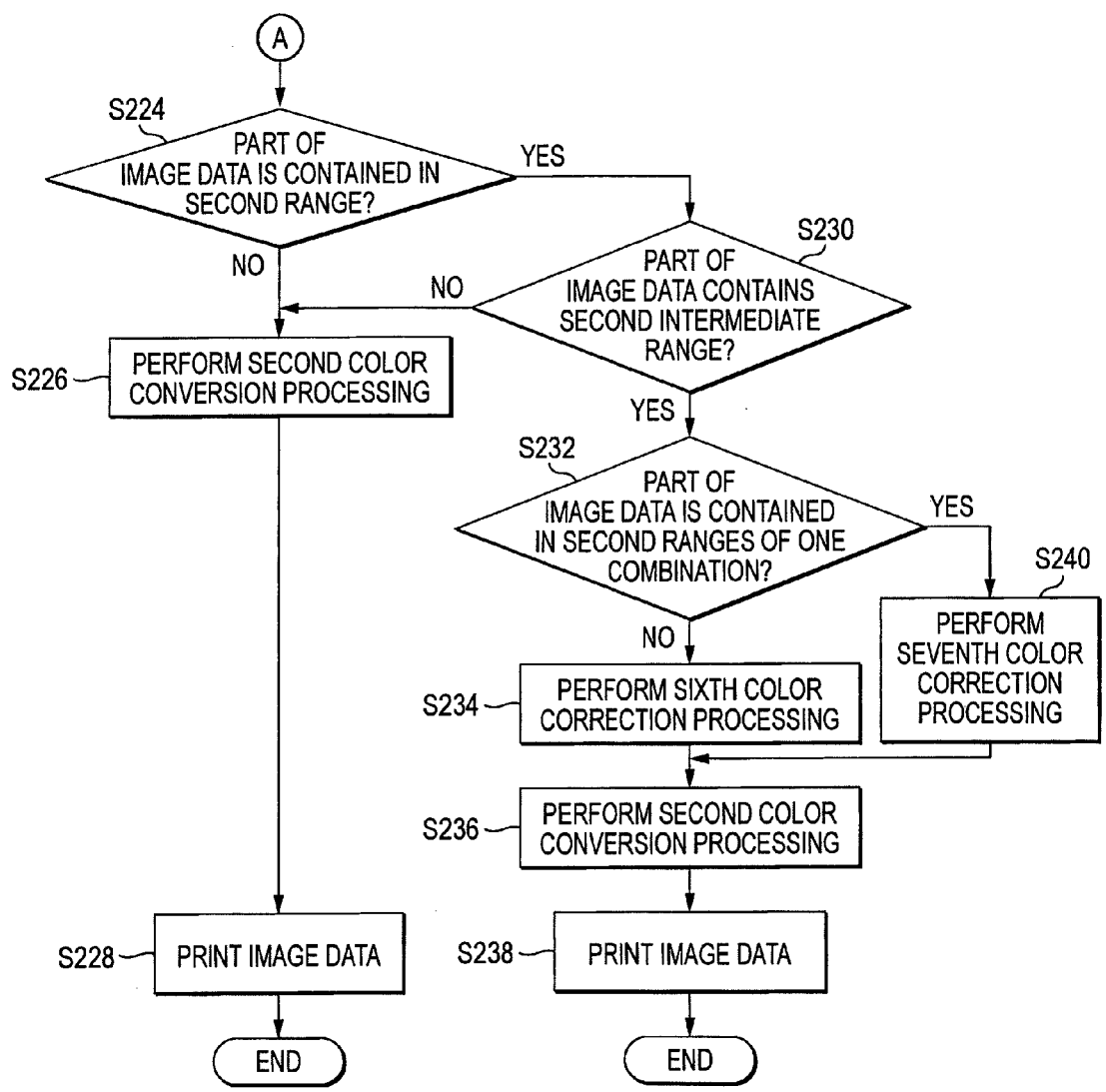
FIG. 15 is a flowchart to show the general operation of the image processing apparatus according to the second exemplary embodiment of the invention.

FIGS. 14 and 15 are flowcharts to show the general operation of the image processing apparatus 2 according to the second exemplary embodiment of the invention.

In FIG. 14, the processing at step 200 (S200) is the same as the processing at step 100 (S100) in FIG. 9, and the processing at steps 204 to 208 (S204 to S208) is the same as the processing at steps 104 to 108 (S104 to S108) in FIG. 9. The processing at step 210 (S210) is the same as the processing at step 124 (S124) in FIG. 9, and the processing at step 214 (S214) is the same as the processing at step 102 (S102) in FIG. 9. The processing at steps 218 and 220 (S218 and S220) is the same as the processing at steps 112 and 114 (S112 and S114) in FIG. 9.

In FIG. 15, the processing at step 226 (S226) is the same as the processing at step 118 (S118) in FIG. 9, and the processing at step 228 (S228) is the same as the processing at step 124 (S124) in FIG. 9. The processing at step 232 (S232) is the same as the processing at step 116 (S116) in FIG. 9, the processing at step 236 (S236) is the same as the processing at step 118 (S118), and the processing at step 238 (S238) is the same as the processing at step 124 (S124).

Different steps from those in FIG. 9 will be discussed below:

As shown in FIG. 14, at step 202 (S202), the first determination section 200 in FIG. 11 determines whether or not a part of the image data generated at step 200 is contained in at least any of the first ranges. If a part of the image data is contained in none of the first ranges, the process goes to step 204; if a part of the image data is contained, the process goes to step 212.

At step S212, the second determination section 202 in FIG. 11 determines whether or not a part of the image data generated at step 200 generated at step 200 contains the first intermediate range. If a part of the image data does not contain the first intermediate range, the process goes to step 204. On the other hand, if a part of the image data contains the first intermediate range, the process goes to step 214 and the third determination section 204 in FIG. 11 determines whether or not a part of the image data generated at step 100 is contained in the first ranges of a predetermined combination.

At step 216 (S216), the fourth color correction section 206 in FIG. 11 performs color correction processing for the image data generated at step 200 and contained in the first ranges and the image data contained in the intermediate range.

At step 222 (S222), the fifth color correction section 208 in FIG. 11 performs color correction processing for the image data generated at step 200 and contained in the first ranges and the image data contained in the intermediate range.

As shown in FIG. 15, at step 224 (S224), the fourth determination section 210 in FIG. 11 determines whether or not a part of the image data subjected to the image processing at step 220 is contained in at least any of the second ranges. If a part of the image data is contained in none of the second ranges, the process goes to step 226; if a part of the image data is contained, the process goes to step 230.

At step 230 (S230), the fifth determination section 212 in FIG. 11 determines whether or not a part of the image data subjected to the image processing at step 220 contains the second intermediate range. If a part of the image data does not contain the second intermediate range, the process goes to step 226. On the other hand, if a part of the image data contains the second intermediate range, the process goes to step 232 and the sixth determination section 214 determines whether or not a part of the image data subjected to the image processing at step 220 is contained in the second ranges of a predetermined combination.

At step 234 (S234), the sixth color correction section 216 in FIG. 11 performs color correction processing for the image data subjected to the image processing at step 220 and contained in the second ranges and the image data contained in the intermediate range.

At step 240 (S240), the seventh color correction section 218 in FIG. 11 performs color correction processing for the image data subjected to the image processing at step 220 and contained in the second ranges and the image data contained in the intermediate range.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a read section that reads a document and generates multilevel image data from the document;
   a first correction unit that, in response to at least a part of the multilevel image data being contained in a first range which is predetermined as indicating a fluorescent color, corrects the multilevel image data so as to move the multilevel image data contained in the first range outside of a print color range,
   an image processing unit that, in response to at least a part of the multilevel image data subjected to the correction processing by the first correction unit not being contained in a third range predetermined as indicating a fluorescent color, performs image processing for the multilevel image data corrected by the first correction unit and that, in response to the multilevel image data subjected to the correction processing being contained in the third range, does not perform the processing for the multilevel image data corrected by the first correction unit; and
   a second correction unit that, in response to at least a part of the multilevel image data subjected to the correction processing by the first correction unit being contained in the third range and the image processing unit not performing the image processing for at least a part of the multilevel image data subjected to the correction processing by the first correction unit, corrects the multilevel image data contained in the third range so as to move the multilevel image data contained in the third range into the print color range.

2. The image processing apparatus according to claim 1, further comprising:
   an image processing unit that performs image processing for the multilevel image data corrected by the first correction unit; and
   a second correction unit that, in response to at least a part of the multilevel image data subjected to the image processing by the image processing unit being contained in a second range which is predetermined as indicating a fluorescent color, corrects the multilevel image data subjected to the image processing by the image processing unit so as to move the multilevel image data contained in the second range into the print color range.

3. The image processing apparatus according to claim 1, wherein the print color range is determined based on values of a plurality of color patches previously extracted as general printed matter colors.

4. The image processing apparatus according to claim 1, wherein the first correction unit further corrects the multilevel image data contained in a first intermediate range positioned between the multilevel image data contained in the first range and a peripheral range nearest to a color of the multilevel image data in the print color range according to a position of the first intermediate range.

5. The image processing apparatus according to claim 2, wherein the second correction unit further corrects the multilevel image data contained in a second intermediate range positioned between the image data subjected to image processing by the image processing unit and contained in the second range and a peripheral range nearest to the color of the image data in the print color range according to the position of the second intermediate range.

6. The image processing apparatus according to claim 2, further comprising an output unit that outputs the multilevel image data,
   wherein the second correction unit, in response to the part of the multilevel image data subjected to the image processing by the image processing unit being contained in the second range, corrects the multilevel image data contained in the second range so as to move the multilevel image data contained in the second range within a color range of the output unit.

7. The image processing apparatus according to claim 6, wherein the color range of the output unit is a range determined based on values of a plurality of color patches previously extracted as a color reproduced in the output unit.

8. The image processing apparatus according to claim 1, wherein, when a plurality of first ranges exist and a part of the multilevel image data generated by the read unit is contained in the plurality of first ranges, the first correction unit corrects the image data pieces contained in the plurality of first ranges so that a distance between the image data pieces are set at a given distance.

9. The image processing apparatus according to claim 1, wherein, when a plurality of second ranges exist and a part of the multilevel image data subjected to the image processing by the image processing unit is contained in the plurality of second ranges, the second correction unit corrects the image data pieces contained in the plurality of second ranges so that a distance between the image data pieces is set at a given distance.

10. The image processing apparatus according to claim 1, wherein the print color range is determined based on values of a plurality of color patches previously extracted as general printed matter colors.

11. The image processing apparatus according to claim 1, further comprising an output unit that outputs the multilevel image data,
   Wherein the second correction unit, in response to a part of the multilevel image data subjected to the image processing by the image processing unit being contained in a second range predetermined as indicating a fluorescent color, corrects the multilevel image data contained in the second range by moving the multilevel image data contained in the second range into a color range of the output unit.

12. The image processing apparatus according to claim 11, wherein the color range of the output unit is a range determined based on values of a plurality of color patches previously extracted as a color reproduced in the output unit.

13. The image processing apparatus according to claim 11, wherein the second correction unit further corrects, before the image processing by the image processing unit, the multilevel image data contained in a second intermediate range positioned between the image data contained in the third range and a peripheral range nearest to the color of the image data in the print color range according to the position of the second intermediate range.

14. A non-transitory computer readable medium storing a program causing a computer to execute a process for image processing, the process comprising:

reading a document and generates multilevel image data from the document;

correcting, in response to at least a part of the multilevel image data is contained in a first range predetermined as indicating a fluorescent color, the multilevel image data contained in the first range by moving the multilevel image data contained in the first range outside of a print color range;

performing, in response to at least apart of the multilevel image data subjected to the correction processing by the first correction unit not being contained in a third range predetermined as a color indicating a fluoresce color, image processing for the corrected multilevel image data, and not performing the image processing in response to the multilevel image data subjected to the correction processing being contained in the third range;

correcting, in response to at least a part of the multilevel image data subjected to the correction processing by the first correction unit being contained in the third range and the performing not being executed, the multilevel image data contained in the third range so as to move the multilevel image data contained into the third range in the print color range.

\* \* \* \* \*